Aug. 14, 1934.  E. J. O'FLAHERTY  1,970,056
TOOL CHUCK
Filed June 17, 1931  2 Sheets-Sheet 1
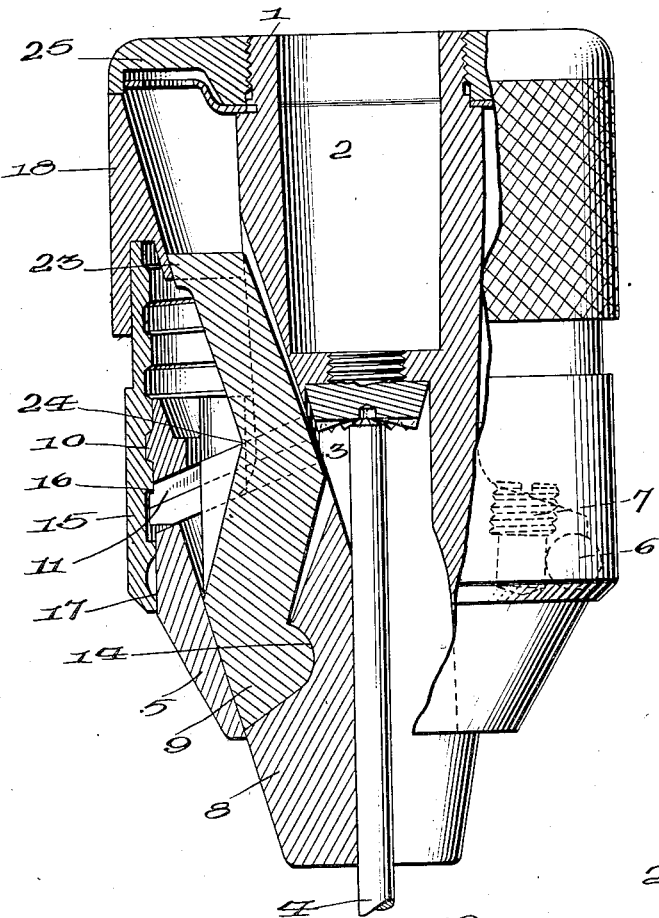
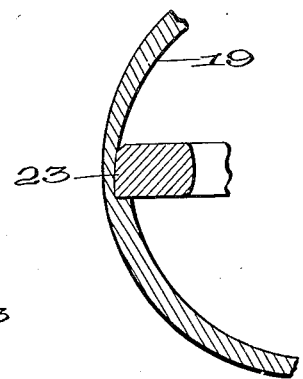
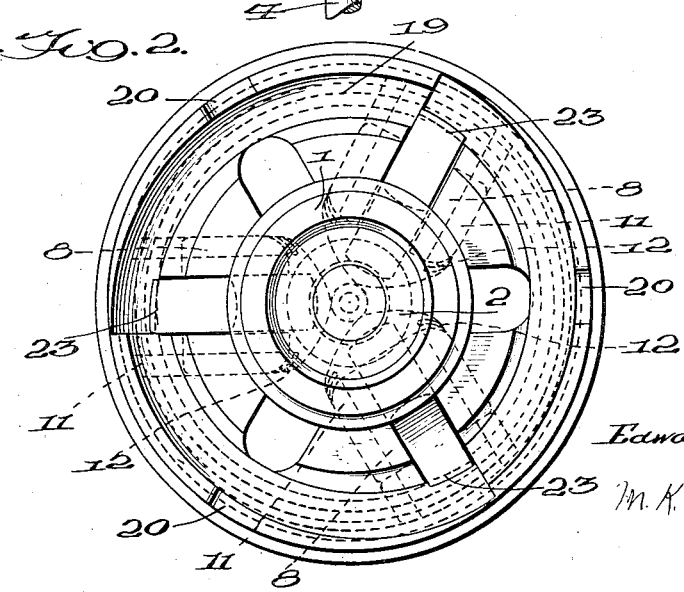
Inventor
Edward J. O'Flaherty,
M. K. Saunders
Attorney Aug. 14, 1934.  E. J. O'FLAHERTY  1,970,056
TOOL CHUCK
Filed June 17, 1931  2 Sheets-Sheet 2
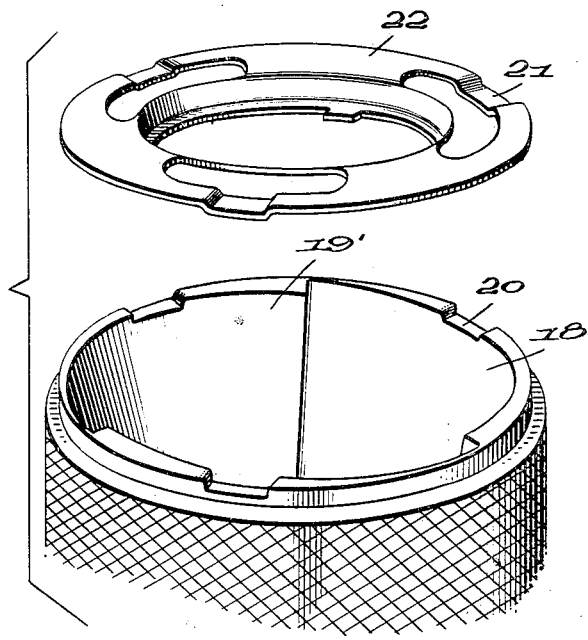
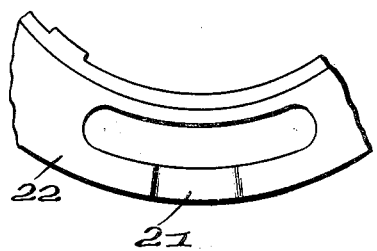
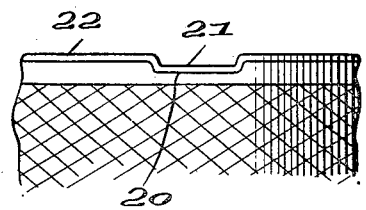
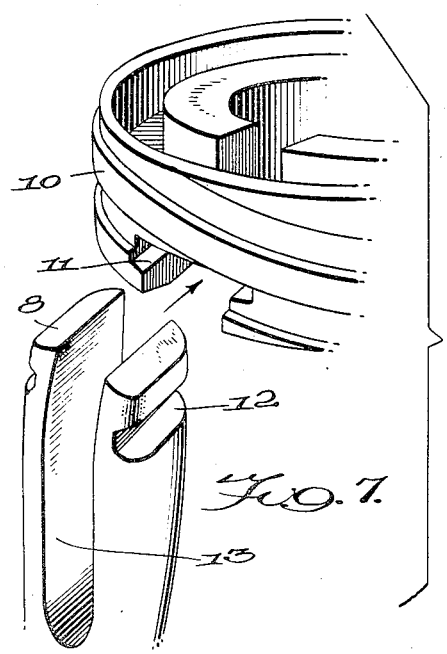
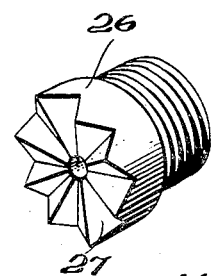
Inventor
Edward J. O'Flaherty,
By M. K. Saunders
Attorney Patented Aug. 14, 1934

1,970,056

UNITED STATES PATENT OFFICE 1,970,056

TOOL CHUCK

Edward J. O'Flaherty, Detroit, Mich.

Application June 17, 1931, Serial No. 545,117

4 Claims. (Cl. 279—65)

This invention relates to a chuck or socket for drills, bits and the like such as is disclosed in my prior Patent No. 1,694,558, granted December 1, 1928, and No. 1,839,252 granted January 5, 1932 and the object of my invention is to provide an improved tool chuck which is simple in construction and effective in operation.

Another object of my invention is to provide a tool chuck in which the parts may be easily assembled.

A further object of my invention is to provide a tool chuck in which jaws are provided for holding the tool in place together with a clamping means for the jaws, a clamping means being held in inoperative position while the jaws are extended or retracted.

I accomplish the above and other objects of my invention, which will be apparent as the description proceeds, by means of the construction shown in the accompanying drawings in which Figure 1 is an elevation, partly in section, and partly broken away, of my improved chuck with a tool clamped therein;

Figure 2 is a top plan of my improved chuck, with the shank removed;

Figure 3 is a sectional plan of the cam ring and a clamping dog, with parts broken away;

Figure 4 is a perspective of the cam ring and the spring holder for holding the cam ring in neutral position;

Figure 5 is a plan of the spring holder, with parts broken away;

Figure 6 is an elevation, partly broken away, of the cam ring;

Figure 7 is an elevation showing the upper portion of a jaw and the cooperating jaw carrier;

Figure 8 is a perspective of the tool positioner.

On the drawings, in which like reference characters indicate like parts on all the views thereof, 1 indicates the main body member having a longitudinal recess 2 in the upper portion thereof for the reception of a shank and the recess 3 in the lower portion for the reception of the tool 4. The body member is formed with an enlarged lower portion 5; in suitable recesses adjacent the junction of the lower enlarged portion and upper portion are positioned ball-bearings 6 held in place by means of heavy grease and screws 7.

Extending through the body member 1 and terminating in the lower recess 3 are three oblique openings for the reception of the jaws 8 and the clamping levers 9. The jaws are slidably mounted in the openings by means of a jaw carrier 10, being supported thereby by the engagement of the inwardly extending lugs 11 in recesses 12 formed in the upper periphery of the jaws.

The jaws 8 are each provided with a longitudinal slot 13 forming a bifurcation in which is loosely mounted a clamping lever 9. The bifurcation is formed with a sloping wall terminating in a rounded or spherical lower base 14 as is clearly shown in Figure 1. Each clamping lever 9 is provided with a rounded or spherical face substantially conforming to the sloping wall and rounded base of the jaw bifurcation in which it is seated.

A jaw carrier operating ring 15 is formed with an internal left-hand helical groove adapted to cooperate with a similarly formed external groove 16 on the jaw carrier whereby the relative rotation of the carrier and the operating ring will advance and retract the carrier and thus extend and retract the jaws 8. The lower inner periphery of the jaw carrier operating ring is adapted to engage the face 17 of the body member 1 and will be held in position by the balls 6 which are forced outwardly thereagainst by manipulating the screws 7.

A cam ring 18 cooperates with the clamping levers 9 for moving the jaws to their clamping position. The ring 18 has a tapered inner wall in which are formed three cam faces 19 for cooperation with the clamping levers as will presently appear. The upper edge of the cam ring is provided with three indentations 20, which cooperate with bosses 21 formed on the spring ring 22 for holding the cam ring in neutral position while the jaws are being advanced or retracted by the jaw carrier operating ring.

The levers are each formed with an extension 23 at the upper end thereof which extension is adapted to ride on a cam face. Thus, when the cam ring is turned to cause the extensions 23 to ride on the cam faces the upper ends of the levers will be forced radially inwardly towards the center of the chuck; this movement of the upper ends of the levers tends to pivot the levers in the jaw bifurcation and forces them outwardly at their lower ends. The lower ends of the levers are prevented from moving outwardly of the bifurcation by the walls of the oblique openings in member 1 as is shown in section in Figure 1. Since the levers cannot move outwardly, the force exerted against them causes them to act on the clamping jaws through their similarly formed contact faces, the jaws being thus clamped against the tool 4. The levers are prevented from riding off of the high part of the cam faces due to the fact that the oblique openings are of such cross-section that, when the extension 23 is against the high part of the cam face, the face 24 of the dog will abut against the wall of the opening.

In order to hold the cam ring in position, a cover member 25 is provided which is formed with screw threads cooperating with the screw threads on the body member.

A tool positioning member 26 has screw threaded engagement with the body member and is located between the upper recess 2 and the lower recess 3. Not only does this member, which is provided with a corrugated face 27 serve to keep the tool from slipping, but should the handle stick, the removal of this screw provides an opening into which a small punch may be inserted in order to force out the stuck shank.

In manipulating the chuck to insert the tool in place, the jaw carrier and the jaws will be retracted. The tool is then inserted into the recess 3 with the jaws surrounding the same. The jaw carrier is then operated in the reverse direction so as to advance the jaws. During this operation of advancing the jaws, the spring ring 22 holds the cam ring from rotation by the interengagement of the bosses 21 and the recesses 20. When the cam ring is rotated, only a slight force is required to spring the bosses out of the recesses. The cam ring may then be rotated so that the extensions on the levers will ride on the internal cam faces of the ring, the lower faces of the levers bearing against the jaws and forcing them toward the center of the body member and thus clamp the tool in position.

Having thus described my invention, what I claim as new and desire to secure by Letters Patent is:—

1. In a chuck, a body member provided with a plurality of oblique sockets, jaws in said sockets, means for extending the jaws, means for clamping the jaws in their extended position, said last named means comprising a longitudinally movable jaw carrier, clamping levers carried by said jaws, a cam ring relatively movable with relation to said jaw carrier and said body member for moving said levers to clamp the jaws in extended position, and resilient means for holding the cam ring inoperative while the jaws are being moved to their extended position.

2. In a chuck, a body member provided with a plurality of oblique sockets, jaws in said sockets, means for extending the jaws, means for clamping the jaws in their extended position, said last named means comprising a longitudinally movable jaw carrier, clamping levers carried by said jaws, a cam ring relatively movable with relation to said jaw carrier and said body member for moving said levers to clamp the jaws in extended position, and means for holding the cam ring inoperative while the jaws are being moved to their extended position, said last named means comprising a spring ring.

3. In a chuck, a body member provided with a plurality of oblique sockets, jaws in said sockets, means for extending the jaws, means for clamping the jaws in their extended position, said last named means comprising a longitudinally movable jaw carrier, clamping levers carried by said jaws, a cam ring relatively movable with relation to said jaw carrier and said body member for moving said levers to clamp the jaws in extended position, and means for holding the cam ring inoperative while the jaws are being moved to their extended position, said last named means comprising a spring ring, said spring ring and said cam ring having interengaging parts.

4. In a chuck, a body member provided with a plurality of oblique sockets, a plurality of jaws slidable in said sockets and having faces cooperating with the walls of said sockets, means for extending said jaws, each of said jaws being provided with a longitudinal bifurcation having a rounded base and rounded internal wall, levers for clamping said jaws in extended position, said levers being received in said bifurcations, each of said levers having rounded faces conforming to the rounded base and internal wall of the bifurcation whereby the levers may slide and pivot relatively to said jaws.

EDWARD J. O'FLAHERTY.